United States Patent [19]

Jöhnk et al.

[11] Patent Number: 4,670,816

[45] Date of Patent: Jun. 2, 1987

[54] PLASTIC FILM CAPACITOR IN CHIP CONSTRUCTIONAL FORM

[75] Inventors: Kurt Jöhnk, Neustadt; Dieter Mayer, Mannheim, both of Fed. Rep. of Germany

[73] Assignee: Wolfgang Westermann, Mannheim, Fed. Rep. of Germany

[21] Appl. No.: 823,454

[22] Filed: Jan. 28, 1986

[30] Foreign Application Priority Data

Feb. 20, 1985 [DE] Fed. Rep. of Germany ....... 3505883

[51] Int. Cl.⁴ ..................... H01G 4/08; H01G 7/00; H02G 13/08
[52] U.S. Cl. .................................. 361/323; 29/25.42; 174/52 PE
[58] Field of Search ............... 361/306, 308, 309, 310, 361/400, 402, 404, 433 S, 433 C, 321, 323; 206/328, 331, 334; 174/52 S, 52 PE; 29/25.42

[56] References Cited

U.S. PATENT DOCUMENTS

| | | | |
|---|---|---|---|
| 3,585,468 | 6/1971 | Chertok | 361/323 |
| 4,205,365 | 5/1980 | Kalina | 361/308 |
| 4,255,779 | 3/1981 | Meal | 361/308 |
| 4,417,298 | 11/1983 | Nakata et al. | 361/433 |
| 4,578,737 | 3/1986 | Westermann | 361/308 |

FOREIGN PATENT DOCUMENTS

| | | |
|---|---|---|
| 0130386 | 5/1984 | European Pat. Off. . |
| 7331717 | 11/1973 | Fed. Rep. of Germany . |
| 2353154 | 4/1975 | Fed. Rep. of Germany . |
| 7700688 | 5/1977 | Fed. Rep. of Germany . |
| 2607083 | 9/1977 | Fed. Rep. of Germany .... 174/52 S |
| 2844830 | 4/1980 | Fed. Rep. of Germany . |
| 7839001 | 6/1982 | Fed. Rep. of Germany . |
| 3320257 | 8/1984 | Fed. Rep. of Germany . |
| 3332293 | 3/1985 | Fed. Rep. of Germany . |
| 3505883 | 7/1986 | Fed. Rep. of Germany . |
| 181097 | 5/1956 | Japan .................................. 206/334 |
| 484925 | 5/1938 | United Kingdom ........... 174/52 PE |

*Primary Examiner*—Donald A. Griffin
*Attorney, Agent, or Firm*—Schwartz, Jeffery, Schwaab, Mack, Blumenthal & Evans

[57] ABSTRACT

A plastic-film wound capacitor comprising a cast-resin cast-coated cup encapsulation and sheet connecting elements fastened to the front sides of the wound capacitor body and projecting through this encapsulation via slots. The slots are sealed when casting by a pre-cast so that, after complete casting up to the top edge of the cup encapsulation, a moistureproof encapsulation of the wound capacitor body is given.

6 Claims, 5 Drawing Figures

PLASTIC FILM CAPACITOR IN CHIP CONSTRUCTIONAL FORM

BACKGROUND OF THE INVENTION

The present invention relates to a plastic-film capacitor, in particular to a metallized, flat, wound capacitor comprising a moistureproof encapsulation and sheet connecting elements fastened to the frontal sides of the capacitor and projecting through the encapsulation, and a process for the production thereof.

Wound plastic-film capacitors in chip configuration are known, for example, from German Offenlegungsschrift No. 3,320,257, which are encapsulated in thermosetting plastic compression molding compounds and which exhibit connecting elements of thin sheet metal at their end faces. The disclosed use of encapsulation and sheet metal connecting elements, respectively, serves to protect the sensitive wound capacitor body against stresses that arise during dip soldering, when the entire wound capacitor body comes into direct contact with liquid tin at a temperature of approximately 260 degrees C., during a soldering time of approximately 5 seconds. The thermosetting encapsulation, which remains dimensionally stable at the temperature of soldering, prevents a bulging of the wound capacitor body, which results from the trapping of air between the individual wound layers and the shrinking of the stretched plastic films. The connecting elements, comprised of thin sheet metal having a thickness of preferably 0.1 mm or more, form a good heat resistor with respect to the wound capacitor body.

In the case of plastic-film capacitors, however, the above-described technique of encapsulating chip-configured capacitors with thermosetting plastic compression molding compounds has a number of shortcomings. The encapsulation process must be carried out at high pressures and temperatures between 150 and 180 degrees C.; as a result, for example, in the case of superthin film capacitors of polyester, there may occur a shrinking of the plastic films and heat damage to the dielectric material. In the case of metallized wound capacitors capable of regeneration, the increased layer pressure in the wound capacitor body produced by the encapsulation pressure also brings about an impairment of the regeneration capability and, consequently, the risk of a reduced insulation resistance.

For small components such as chip capacitors, the efficiency of this encapsulation technique is also impaired by the extremely ineffective usage of the encapsulating material. Encapsulation in the end product incorporates less than 10 percent of the encapsulation material actually used; the remainder of the encapsulating material accumulates as spiderlike sprue. But a repetition of the injection molding of the spiderlike sprue material is out of the question, since a thermosetting material is involved. Consequently, after the processing, more than 90 percent of the expensive plastic compression molding compound accumulates as unavoidable scrap.

SUMMARY OF THE INVENTION

It is therefore an object of the present invention to provide encapsulated, wound plastic film capacitors in chip configuration that can be manufactured more simply and more economically than known chip capacitors.

It is also an object of the present invention to provide a chip capacitor with improved electrical properties that is dimensionally stable during soldering to mount the chip on a conductor board, and which exhibits good heat resistance at the resulting connections.

In accomplishing the foregoing objects, it has been provided, in accordance with one aspect of the present invention, a capacitor in chip configuration comprising:
(i) a capacitor body comprised of synthetic resin film as dielectric;
(ii) a coating provided on said capacitor, said coating comprising a thermosetting material;
(iii) two sheet connecting elements fastened to the frontal sides of said capacitor body and projecting through said coating and a cup encapsulation provided around said coating on their corresponding frontal sides, said projecting sections of said sheet connecting elements being bent on said frontal sides of said cup encapsulation.

In accordance with another aspect of the present invention, a process has been provided for manufacturing a capacitor in chip configuration, comprising:
(a) introducing said capacitor body contacted with said sheet connecting elements into said cup encapsulation, having said slots receiving said sheet connecting elements;
(b) pre-casting said capacitor body with a small amount of cast-resin for fixing said capacitor body in said cup encapsulation, said cast-resin rising in said slots up to the top edge of said cup encapsulation due to capillary effect;
(c) effecting a post-cast up to the top edge of said cup encapsulation after the pre-cast has been cured and
(d) positioning the projecting sections of said sheet connecting elements on said frontal sides of said cup encapsulation by bending.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent from this description to those skilled in the art.

DETAILED DESCRIPTION OF PREFERRED EMBODIMENTS

By using the cast-resin, cast-coated cup encapsulation known for conventional, wired wound plastic-film capacitors for chip capacitors comprising sheet connecting elements projecting through the encapsulation, all advantages of the capacitors produced in accordance with the known cup casting process can be made available for chip capacitors. This casting process has been widely used for wired wound plastic-film capacitors because it can be implemented inexpensively, with low material usage and little waste, and can be automated with high productivity, to yield a high-quality encapsulation, e.g., as reflected by the high moisture protection provided. The art is familiar with modern dispensing systems for casting resin. These systems calculate the required quantities precisely for the number of capacitors to be coated by casting, thereby eliminating accumulation of excess as waste. On the other hand, the manufacture of cup encapsulation is also virtually free of waste; if thermoplastic materials are used, the spider-like sprue can be comminuted and injection molded again. When using a suitable encapsulation material such as a polyester or poly (phenylene sulfide) material, a dimensional stability as good as the known thermosetting press mass encapsulation for the cast-resin cast-coated cup encapsulation of a chip capacitor in accordance with the invention is guaranteed during and after the soldering process on a conductor board even at finished wall thicknesses from 0.3 mm on. The cast-resin cast-coated cup encapsulation of the chip capacitor in accordance with the present invention does not deteriorate the electrical characteristics of the wound plastic-film capacitor. The cast-resin cast-coated cup encapsulation encloses the wound capacitor body virtually without pressure, and consequently does not impair the regeneration capability. As the hardening of the cast-resin takes place at temperatures of approximately 100 degrees C. or lower, a thermal damage to the sensitive dielectric material is also excluded.

Figure 1:
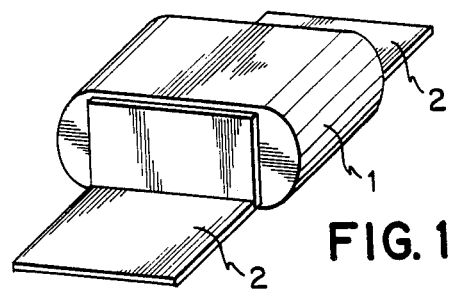
FIG. 1 is a view of a naked wound capacitor body with sheet connecting elements.

FIG. 1 shows a naked wound plastic-film capacitor 1, e.g., with metallized plastic-films, comprising sheet connecting elements 2 contacted at the front side and being made, e.g., of nickel silver.

Figure 2:
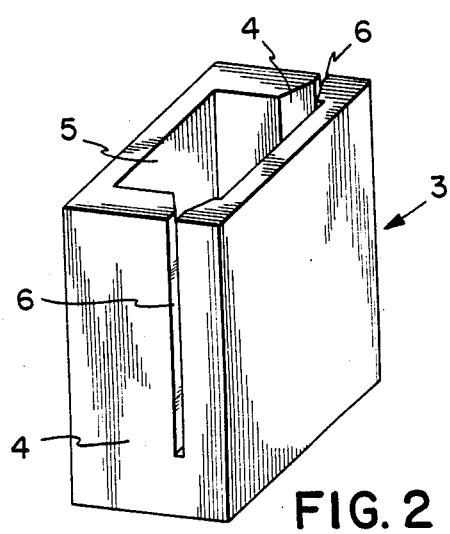
FIG. 2 is a view of an embodiment of a cup encapsulation in accordance with the present invention.
Figure 3:
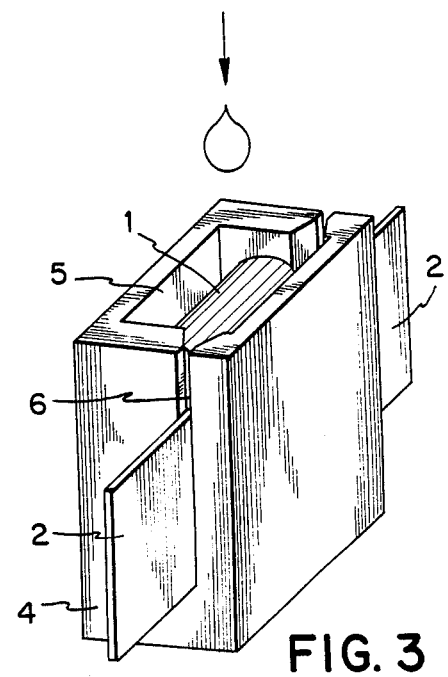
FIG. 3 is a view in accordance with FIG. 2 after introduction of the wound capacitor body in accordance with FIG. 1.

FIG. 2 shows a cup encapsulation 3 comprising slots 6 extending on both narrow sides 4 from the opening 5 of the cup encapsulation. These slots can be formed liplike. As shown in FIG. 3, the naked wound plastic-film capacitor body 1 shown in FIG. 1 is introduced via the opening 5 into the cup encapsulation 3, whereby the slots 6 receive the sheet connecting elements 2 and serve as an outlet opening for those. After the wound plastic-film capacitor body 1 is set into the cup encapsulation 3 a pre-casting with a small amount of resin is performed. This smaller amount of resin fixes the wound plastic-film capacitor body in the cup encapsulation and, due to capillary force, at the same time causes a rising of cast-resin in slots 6 up to the top edge of cup encapsulation 3. After curing of the pre-cast, it has been surprisingly noted in practise that no resin has emerged through slot 6 and around the projecting sheet connecting element 2. The cast-resin located in slot 6 due to capillary force effects a complete sealing of the cup encapsulation 3. The following post-cast fills the cup encapsulation 3 up to the top edge and encloses the wound plastic-film capacitor body moisture-proof. Afterwards, the sheet connecting elements 2 are positioned on the outside of the cup encapsulation 3 by bending and folding, respectively.

Figure 4:
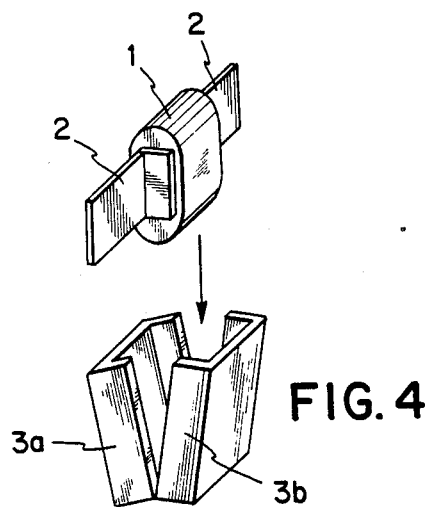
FIG. 4 is a view of another embodiment of the cup encapsulation in accordance with the present invention.

In FIG. 4 another embodiment of the cup encapsulation in the form of two half-shells 3a and 3b is shown. These half-shells are hinged to one another at the lower side, as shown in FIG. 4. After introduction of the wound plastic-film capacitor body 1 in the opened half-shells 3a and 3b, the half-shells are folded up and the cast-resin casting is performed.

Figure 5:
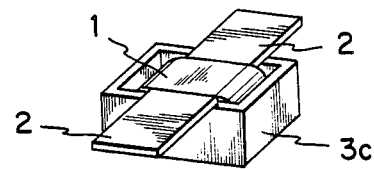
FIG. 5 is a view of still another embodiment of the cup encapsulation in accordance with the present invention.

In FIG. 5, another embodiment of the cup encapsulation in form of a flat cup 3c is shown.

It is preferred that the width of slot 6 is equal to or slightly smaller than the thickness of the elements 2. Elements 2 have a preferred thickness of 0.1 to 0.5 mm.

Examples of materials for the various elements of the capacitor of this invention are shown in the following:

Cup 3: polyester, preferably poly (phenylene sulfide);

Cast resin: epoxy resin, polyester resins;

Sheet connecting elements 2: copper, brass, steel, nickel, preferably nickel silver, all preferably tinned.

What is claimed is:

1. A capacitor in chip configuration comprising:
   (i) a cup encapsulation body comprising an inner surface that defines a cavity which has an opening;
   (ii) a capacitor body provided in said cavity such that a gap exists between said capacitor body and said inner surface of said cup encapsulation body, said capacitor body being comprised of synthetic resin film as dielectric;
   (iii) a coating provided on said capacitor body which fills said gap, said coating comprising a thermosetting material; and
   (iv) two sheet connecting elements, each connecting element being fastened to a side of said capacitor body and projecting through a region of said coating and said cup encapsulation body, respectively, which corresponds to said side of said capacitor, wherein each projecting section of said sheet connecting elements is bent on a side of said cup encapsulation body.

2. A capacitor according to claim 1, wherein said cup encapsulation body is provided with slots that extend from said opening along the sides of said cup encapsulation body such that each of said connecting elements projects through a slot.

3. A capacitor according to claim 2, wherein said slots are formed liplike.

4. A process for manufacturing a capacitor according to claim 2, comprising:
   (a) introducing said capacitor body contacted with said sheet connecting elements into said cup encapsulation body, said slots receiving said sheet connecting elements;
   (b) pre-casting said capacitor body with a small amount of cast-resin for fixing said capacitor body in said cup encapsulation, said cast-resin rising in said slots up to the upper edge of said cup encapsulation body due to capillary effect;
   (c) effecting a post-cast up to the upper edge of said cup encapsulation after the pre-cast has been cured and
   (d) positioning the projecting sections of said sheet connecting elements on said frontal sides of said cup encapsulation body by bending.

5. A capacitor according to claim 1, wherein said cup encapsulation body comprises two half-shells.

6. A capacitor according to claim 5, wherein said half-shells are hinged to another on the side opposite to the opening of said cup encapsulaton body.

* * * * *